United States Patent [19]

Curzio

[11] Patent Number: 4,539,249
[45] Date of Patent: Sep. 3, 1985

[54] METHOD AND APPARATUS FOR PRODUCING BLENDS OF RESINOUS, THERMOPLASTIC FIBER, AND LAMINATED STRUCTURES PRODUCED THEREFROM

[75] Inventor: Frederick H. Curzio, Garden Grove, Calif.

[73] Assignee: Textile Products, Incorporated, Anaheim, Calif.

[21] Appl. No.: 529,514

[22] Filed: Sep. 6, 1983

[51] Int. Cl.³ .......................... B32B 1/00; B32B 3/00
[52] U.S. Cl. ..................... 428/175; 264/103; 264/253; 264/546; 264/552; 428/296; 428/367; 428/408
[58] Field of Search ............... 428/408, 367, 259, 296, 428/175; 264/546, 552, 103, 253

[56] References Cited

U.S. PATENT DOCUMENTS

| | | | |
|---|---|---|---|
| 3,573,086 | 3/1971 | Lambdin et al. | 117/46 |
| 3,769,144 | 3/1972 | Economy et al. | 161/50 |
| 3,850,785 | 8/1973 | McQuade et al. | 161/88 |
| 3,914,494 | 7/1974 | Park | 428/247 |
| 3,925,587 | 7/1974 | Park | 428/255 |
| 3,955,022 | 10/1972 | Sands | 428/95 |
| 3,993,827 | 8/1975 | Dukert et al. | 428/251 |
| 4,263,367 | 4/1981 | Prewo | 428/338 |
| 4,312,913 | 1/1982 | Rheaume | 428/257 |
| 4,329,387 | 5/1982 | Goodrich et al. | 428/196 |

OTHER PUBLICATIONS

Solventless fabrication of Reinforced Composites, by Robert M. Baucom NASA Tech. Briefs, Fall 1982, p. 98, LAR-12856.

*Primary Examiner*—Marion E. McCamish
*Attorney, Agent, or Firm*—Willie Krawitz

[57] ABSTRACT

Reinforced structures of graphite, fiberglass, and the like, together with thermoplastic resinous fibers such as in ribbon, filament and monofilament form are produced. The graphite fiber is combined or blended with a resinous fiber to form a single yarn. The blended yarn is then woven into a soft, supple and flexible fabric having the appropriate concentration of graphite and resin, and with good uniform characteristics. Hybrid fabrics produced by interweaving graphite and the polymeric fibers, ribbon, etc., may be utilized instead of the blended yarn. The fabric is finally shaped to conform with a mold or substrate and heated to melt the resin and produce the resin-graphite laminate.

24 Claims, 2 Drawing Figures

METHOD AND APPARATUS FOR PRODUCING BLENDS OF RESINOUS, THERMOPLASTIC FIBER, AND LAMINATED STRUCTURES PRODUCED THEREFROM

BACKGROUND OF THE INVENTION

This invention relates to laminates of a synthetic resin containing graphite, fiberglass, ceramics and similar fibers, and to a process for producing them. The laminates of this invention are especially suited for use as aircraft components.

One method of presently forming these types of laminates is by bonding a layer of woven graphite fibers to a layer of resin, and heating the two layers to melt the resin and impregnate it into the fiber. However, this technique produces a stiff product that does not follow the contours of a substrate very well.

Another method of producing reinforcement laminates is to simply weave the graphite fiber into a fabric, impregnate the fabric with resin, followed by curing. However, this method requires a wet prepreg system to effect bonding between the graphite fibers and resin.

Still another method of producing laminates is to coat the graphite fibers with polymer powder and then melt the powder into the graphite fibers under pressure to form the laminate. But this process results in loss of resin when the powder separates from the graphite fabric or fibers.

It would be desirable to produce a laminate whose precursor has sufficient flexibility that would enable it to be easily shaped to conform with a substrate, mold, etc.

Further, a graphite and resin fiber laminate is desired in which the interweave of graphite and resinous fibers can be present as various standard weave combinations, such as unidirectional, bidirectional, plain, twill, etc.

In addition, there is desired a laminate of graphite fibers, and the like, with a resinous, thermoplastic material including film and fiber forming resins such as polyethylene, polypropylene, polyester, nylon, polyether ether ketone, etc.

Also, a laminating process is desired that does not involve a messy prepreg step. Eliminating this prepreg step would also avoid storing process chemicals that do not have good shelf life properties, and to avoid refrigeration expenses.

THE INVENTION

According to the invention, there is provided a process and apparatus for producing laminates of graphite, and the like, such as fiberglass, aramid, ceramics, quartz, boron, SiC, etc., with resinous, thermoplastic fibers or filaments, which comprises combining or blending the graphite fibers, and the like, and mixtures thereof with thermoplastic resinous fibers to form a single yarn (or multiples thereof) containing at least one graphite fiber with the resinous fiber. The term 'fiber' includes ribbon, tape, staple fiber, filaments, and monofilaments. As indicated, thermoplastic films such as polyether ether ketone that may be converted into ribbon, tape, e.g. by slitting, are also suitable.

The blended yarn is then woven into a fabric that is soft, flexible, and supple, and this enables it to be easily shaped to a suitable form in a mold, or applied to a backing. If desired, reinforcing fibers such as aluminum and/or steel, etc., may be woven into the fabric together with the graphite-resin yarn, or the steel may be combined into the yarn prior to weaving.

The woven fabric is then shaped, for example, by conforming it to a suitable molding form, or applying it as a reinforcing backing to a substrate. Following this shaping step, the resin in the fabric is melted by heating the shaped fabric under pressure which will vary, depending on the particular resin and end use. The process of this invention enables control of the graphite/resin content by varying the amount of graphite and resin in an individual yarn.

A similar result can be achieved by spinning staple resin fibers with graphite to form the yarn, which is then woven into the fabric prior to shaping and heating. Hybridized fabrics formed by interweaving graphite and resin filaments or fibers in a conventional weaver may also be used. This is followed by shaping and heating to melt the resin and form the laminate.

DESCRIPTION OF THE PREFERRED EMBODIMENTS

Figures 1, 2:
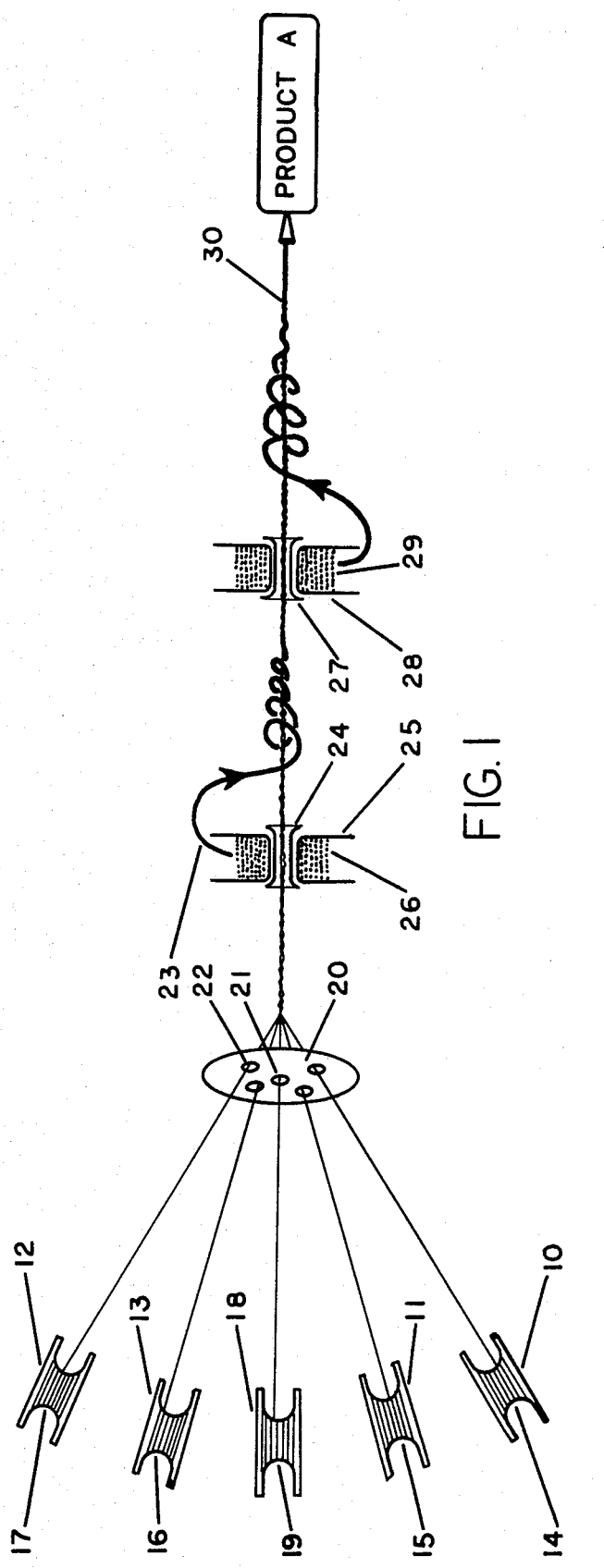
FIG. 1 is a side elevation view showing one form of apparatus for combining graphite and resin fibers into yarn for subsequent conversion to fabric and then to the laminates of this invention; and, FIG. 2 is a schematic representation of a flow diagram showing the process steps of this invention.

The initial step in the process of producing the laminate of this invention involves combining or blending the resinous polymer fibers with graphite fibers, and the like, to form a yarn having a controlled graphite/polymer content. One type of blending system is shown in FIG. 1, and comprises a plurality of spools 10, 11, 12 and 13 wound with thermoplastic resin fibers 14, 15, 16 and 17 such as polyethylene, polypropylene, nylon, polyester, etc. A separate spool 18 wound with graphite fibers 19 is similarly provided, the spools being unwound in the direction shown by the arrows. This arrangement ultimately produces a single yarn having outer resin fibers surrounding the graphite fibers.

The fibers are pulled through a stationary guide plate 20 having a central orifice 21 and a plurality of outer orifices 22 disposed in a circular fashion about the central orifice. The resin and graphite fibers are then combined into a single yarn 23 while being pulled through a guide tube 24 mounted within a spool 25, and as the yarn 23 leaves the tube 24, it is lightly overwrapped with fiber from the spool. The overwrapping procedure is repeated as the yarn is passed through a guide tube 27 and spool 28 having a supply of resin fibers 29. The overwrapped yarn 30 is then passed through guide rollers and onto a wind up roll, neither of which are shown. The yarn can be twisted during or subsequent to the wind up process. Similarly, the resin fibers can be crimped or twisted prior to blending with the graphite fibers.

If an increase in yarn diameter, or a change in graphite fiber content is necessary, the process of blending and/or overwrapping can be varied by changing the number of spools 10–13. Thus, the graphite/resin ratio in the yarn 30 is controlled by the weight of overwrapping of the resin fibers plus the weight of the fibers on the spools 10–13 relative to the weight of the graphite fibers.

It will be appreciated that the graphite fibers may be combined and overwrapped with resin in a tape or ribbon form and/or a fiber. In the case of polyether ether ketone, a typical thickness of the tape or ribbon is about ¾-5 mils, and a typical width is about 60-70 mils. This size range enables the concentration of the resin to be easily controlled. The polyether ether ketone is sold by I.C.I. under the trademark name of "VICTREX" PEEK.

As shown in the flow diagram of FIG. 2, the wound up yarn is woven into fabric by conventional weaving techniques and using typical weaving patterns. As indicated, reinforcing fibers such as steel and aluminum may be woven into the fabric during this stage of the process. It is important to recognize that the woven fabric is, in effect, a dry prepreg with all its advantages and none of the disadvantages of a wet prepreg. This enables the fabric to be stored indefinitely without any requirements of refrigeration or special equipment.

In the case of polyether ether ketone, where it is difficult to form the monofilament, the resin may be converted into film, which is then slit into ribbons or tape by conventional slitting equipment. The ribbons (or tape) can then be fed directly to a weaver, such as a Crompton & Knowles C-3, and interwoven with graphite fibers. Alternatively, the ribbon can be fed to a plurality of reels driven by a device similar to that disclosed in my U.S. Pat. No. 4,271,570, and incorporated herein by reference. The ribbon is then fed from the reels directly to the weaver for interweaving with the graphite.

Other embodiments of this invention may be used without departing from the spirit thereof. For example, various chemicals may be employed to improve bonding between the resin fibers and the graphite fibers. Also, other techniques or processes may be used to similarly combine the graphite and resin fibers into the yarn. These processes include air blowing of the fibers (over rollers and bars), electrostatic separation followed by recombining, etc.

I claim:

1. A process for producing laminates from graphite fibers, and the like, and a plurality of resinous thermoplastic fibers, comprising:
   (a) combining or blending the graphite and thermoplastic fibers into yarn;
   (b) controlling the graphite/resin weight ratio during the blending step;
   (c) weaving the yarn into a flexible, dry fabric adapted for dry storage without refrigeration in which adjacent thermoplastic fibers or yarn, and graphite fibers, and the like, are adapted for sufficient movement relative to each other, thereby enabling the fabric to be conformed to a mold or substrate, the yarn and fibers having a controlled alignment in the fabric due to weaving or blending;
   (d) shaping the fabric in a dry, solvent-free form by conforming the fabric onto said mold or substrate; and,
   (e) heating the fabric under pressure to melt the resin and produce a shaped, graphite-resin laminate in which the graphite and resin are intimately combined in the laminate at the controlled graphite/resin ratio to produce uniform characteristics.

2. The process of claim 1, in which the graphite fibers and the like, are selected from the class consisting of: graphite, fiberglass, ceramic, quartz, boron, and SiC, and the polymeric fibers are selected from the class consisting of polyethylene, aramid, polypropylene, polyester, nylon, and polyether ether ketone.

3. The process of claim 2, in which reinforcing fibers selected from the class consisting of aluminum and steel are woven into the fabric.

4. The process of claim 1, in which an overwrapping of fiber is applied to the yarn during the combining step.

5. The process of claim 1, in which a hybrid fabric is formed by interweaving thermoplastic fibers or ribbon with graphite fibers, and the like.

6. The process of claim 5, in which the thermoplastic ribbon is about ¾-5 mils thick and about 60-70 mils wide.

7. The process of claim 1, in which the graphite fibers, and the like are mechanically separated before they are combined with the polymeric fibers.

8. A woven fabric for conversion into a laminate, the fabric being produced by:
   (a) combining or blending graphite and resinous thermoplastic fibers into yarn;
   (b) controlling the graphite/resin weight ratio during blending: and,
   (c) weaving the yarn into a flexible, dry fabric adapted for dry storage without refrigeration in which adjacent thermoplastic fibers or yarn, and graphite fibers, and the like, are adapted for sufficient movement relative to each other, thereby enabling the fabric to be conformed to a mold or substrate, the yarn and fibers having a controlled alignment in the fabric due to weaving or blending; whereby, i. the fabric is adapted to be shaped in a dry, solvent-free form by conforming the fabric onto said mold or substrate; ii. the resin in the fabric is adapted to melt under heat and pressure to produce a graphite-resin laminate; and, iii. the graphite and resin are intimately combined in the laminate at the controlled graphite/resin weight ratio to produce uniform characteristics.

9. The woven fabric of claim 8, in which an overwrapping of fiber is applied to the yarn in the combining step.

10. The woven fabric of claim 8, in which reinforcing fibers are woven into the fabric.

11. The woven fabric of claim 10, in which the reinforcing fibers are selected from the class consisting of aluminum and steel.

12. The woven fabric of claim 8, in which the graphite fibers and the like are selected from the class consisting of graphite, fiberglass, ceramics, quartz, boron, and SiC, and the polymeric fibers are selected from the class consisting of polyethylene, polypropylene, polyester, nylon, aramid, and polyether ether ketone.

13. The woven fabric of claim 8, in which the graphite fibers, and the like, are surrounded by at least a portion of the polymeric fibers.

14. The woven fabric of claim 8, in which the graphite and polymeric fibers are fed separately to a fabric weaving machine for weaving into the fabric.

15. The woven fabric of claim 8, comprising a hybrid fabric formed by interweaving thermoplastic fibers or ribbon with graphite fibers, and the like.

16. The woven fabric of claim 15, in which the thermoplastic ribbon is about ¾-5 mils thick and about 60-70 mils wide.

17. The woven fabric of claim 8, in which the graphite fibers, and the like are mechanically separated before they are combined with the polymeric fibers.

18. A laminate containing a fabric of woven graphite fibers, and the like, and a resinous, thermoplastic fiber, the laminate being formed by the steps of:

(a) combining or blending the graphite and thermoplastic fibers into yarn, the graphite fibers being surrounded by at least a portion of the thermoplastic fibers;

(b) weaving the yarn into flexible, dry fabric adapted for dry storage without refrigeration, in which adjacent thermoplastic fibers or yarn, and graphite fibers, and the like, are adapted for sufficient movement relative to each other, thereby enabling the fabric to be conformed to a mold or substrate, the yarn and fibers having a controlled alignment in the fabric due to weaving or blending;

(c) shaping the fabric in a dry, solvent-free form by conforming the fabric onto said mold or substrate; and, (d) heating the fabric under pressure to melt the resin and produce a graphite-resin laminate; whereby, (i) the combining or blending step includes controlling the graphite-resin ratio; and, ii. the graphite and resin are intimately combined in the laminate to produce uniform characteristics.

19. The laminate of claim 18, in which the graphite fibers are selected from the class consisting of graphite, fiberglass, ceramics, quartz, boron, and SiC, and the polymeric fibers are selected from the class consisting of polyethylene, polypropylene, polyester, nylon, aramid and polyether ether ketone.

20. The laminate of claim 19, in which reinforcing fibers are woven into the fabric.

21. The laminate of claim 20, in which an overwrapping of fiber is applied to the yarn during the combining step.

22. The laminate of claim 18, in which a hybrid fabric is formed by interweaving thermoplastic fibers or ribbon with graphite fibers, and the like.

23. The laminate of claim 22, in which the thermoplastic ribbon is about $\frac{3}{4}$-5 mils thick, and about 60–70 mils wide.

24. The laminate of claim 18, in which the graphite fibers, and the like are mechanically separated before they are combined with the polymeric fibers.

* * * * *